United States Patent
Herrmann et al.

(10) Patent No.: US 10,113,635 B2
(45) Date of Patent: Oct. 30, 2018

(54) DEVICE REDUCING DRAG LOSS IN AN AUTOMATIC TRANSMISSION

(71) Applicant: ZF Friedrichshafen AG, Friedrichshafen (DE)

(72) Inventors: Markus Herrmann, Scheidegg (DE); Thilo Schmidt, Meckenbeuren (DE); Gerhard Martin, Langenargen (DE); Ahmed Mouhcine, Friedrichshafen (DE); Rainer Grundler, Bodman-Ludwigshafen (DE); Dirk Winkler, Kressbronn (DE); Valentine Vincent, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 236 days.

(21) Appl. No.: 15/199,013

(22) Filed: Jun. 30, 2016

(65) Prior Publication Data

US 2017/0002922 A1   Jan. 5, 2017

(30) Foreign Application Priority Data

Jul. 3, 2015 (DE) .................. 10 2015 212 539

(51) Int. Cl.
F16H 57/04 (2010.01)
F16H 61/14 (2006.01)
F16H 61/48 (2006.01)

(52) U.S. Cl.
CPC ..... *F16H 57/0446* (2013.01); *F16H 57/0412* (2013.01); *F16H 61/14* (2013.01); *F16H 61/48* (2013.01)

(58) Field of Classification Search
None
See application file for complete search history.

(56) References Cited

U.S. PATENT DOCUMENTS

2010/0234176 A1   9/2010   Tanaka et al.
2014/0251745 A1   9/2014   Kutsubo et al.
2017/0261101 A1*  9/2017   Herrmann .............. F16H 45/02

FOREIGN PATENT DOCUMENTS

DE     4342961 C1      4/1995
DE     102010041412 A1   3/2012
DE     102013209932 A1  12/2014

OTHER PUBLICATIONS

German Search Report DE102015212539.4, dated Feb. 22, 2016. (7 pages).

\* cited by examiner

*Primary Examiner* — Jacob S. Scott
(74) *Attorney, Agent, or Firm* — Dority & Manning, P.A.

(57) ABSTRACT

A drag torque reduction device for an automatic transmission includes a hydraulic controller with a radiator. In one embodiment, the drag torque reduction device also includes a parallel connection of a pressure relief valve, a constant aperture and a temperature-dependent, switchable aperture positioned upstream of the radiator. In another embodiment, the drag torque reduction device includes an overflow cooling oil diversion with a temperature-dependent, switchable aperture and a pressure relief valve that is positioned upstream of the radiator.

7 Claims, 6 Drawing Sheets

DEVICE REDUCING DRAG LOSS IN AN AUTOMATIC TRANSMISSION

FIELD OF THE INVENTION

The invention relates generally to a device for reducing the drag torque in an automatic transmission.

BACKGROUND

The lubrication of transmission components and the cooling of components, in particular the shift elements of automatic transmissions of motor vehicles, is typically controlled in a manner dependent on torque and rotational speed, in order to provide the quantity of oil for lubricating and cooling transmission components that is in line with demand as much as possible. Due to the viscous properties of cooling oil, lower volume flows arise at low temperatures than at high temperatures, such that the quantity of oil supplied depends on temperature.

Strict fuel economy and emissions standards have resulted in the need to even further optimize the efficiency of automatic transmissions. Thereby, drag torque in particular is to be reduced in the range relevant for the consumption cycle. The NEDC (New European Driving Cycle) consumption cycle takes place in a limited range of operation, namely in the lower temperature range with moderate transmission loads.

DE 4342961 C1 discloses an arrangement for controlling the temperature of a hydraulic operating medium (working oil) for an automatically shifting transmission and a hydrodynamic torque converter with a converter feed line for the operating medium, for which a radiator for the heat dissipation of the operating medium with a radiator return line leading to the transmission and a control valve working as a function of the temperature of the operating medium are used, and a converter return line outgoing from the torque converter, a radiator supply line leading to the radiator and a line for the control valve directly connected to the transmission are attached, which, at temperatures lower than a lower-temperature phase comprising a threshold value, it is both the case that the converter return line is shut off with respect to the radiator supply line and the line directly connected to the transmission is connected to a first of the lines attached to the control valve, while, at temperatures higher than an upper-temperature phase comprising the threshold value, it is both the case that the converter return line is connected to the radiator supply line and the line directly connected to the transmission is connected to a second of the lines attached to the control valve. It is thereby provided that the converter supply line is also connected to the control valve, that, in the lower-temperature phase, it is both the case that the converter return line is connected to the converter supply line and the line directly connected to the transmission is connected to the radiator supply line, and that, in the upper-temperature phase, the converter supply line is connected to the line directly connected to the transmission, such that a temperature-dependent radiator flow control is realized.

SUMMARY OF THE INVENTION

Exemplary aspects of the present invention provide a device for reducing the drag torque in an automatic transmission comprising multi-disk shift elements, a hydrodynamic torque converter and a converter clutch, which are controlled by a hydraulic controller with a radiator, which enables a reduction of the drag torque by reducing the quantity of cooling and lubricating oil and makes it possible to suspend the reduction of the quantity of cooling and lubricating oil as needed.

Accordingly, a device for reducing the drag torque in an automatic transmission comprising multi-disk shift elements, a hydrodynamic converter and a converter clutch, which are controlled by a hydraulic controller with a radiator, is proposed, which, in the hydraulic controller of the transmission in front of the radiator, features a parallel connection of a pressure relief valve in the direction of flow to the radiator that opens against a spring force above a pressure threshold, a constant aperture securing a minimum flow and a temperature-dependent, switchable aperture opening above a temperature threshold. In this manner, minimum lubrication and cooling are ensured at low temperatures and low system pressures, whereas, at high temperatures and/or pressures, the achievable reduction in the quantity of cooling and lubricating oil is suspended.

Within the framework of an alternative embodiment of the invention, a device for reducing the drag torque in an automatic transmission comprising multi-disk shift elements, a hydrodynamic converter and a converter clutch, which are controlled by a hydraulic controller with a radiator, is proposed, which, in the hydraulic controller of the transmission in front of the radiator, in the direction of flow to the radiator, realizes a diversion of the overflow of the quantity of cooling oil by means of a temperature-dependent, switchable aperture that closes above a temperature threshold and a pressure relief valve that closes above a pressure threshold, which are shifted in the sequence of aperture, pressure relief valve or vice versa.

Through the design in accordance with exemplary aspects of the invention, in the lower temperature range with moderate transmission loads (i.e., in the NEDC consumption cycle), the oiling quantities of the multi-disks of the shift elements is reduced, which, in an advantageous manner, results in a reduction in the drag torques caused by the shift elements.

BRIEF DESCRIPTION OF THE DRAWINGS

In the following, the invention is more specifically illustrated as an example on the basis of the attached figures. The following is shown.

DETAILED DESCRIPTION

Figure 1:
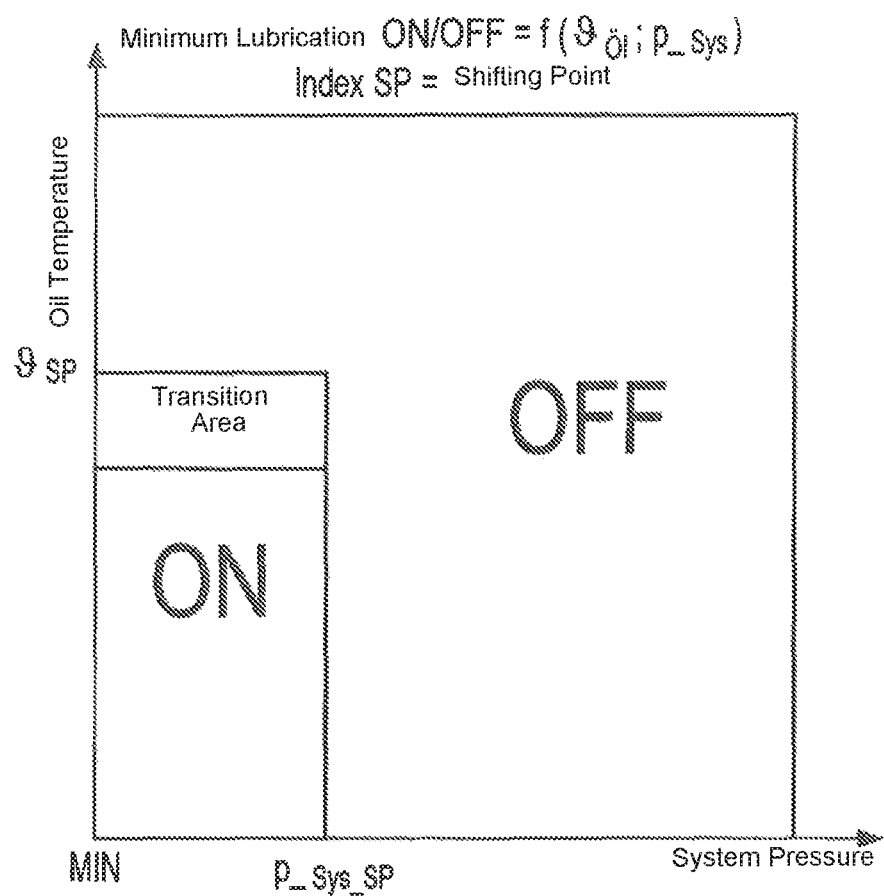
FIG. 1: A system pressure/oil temperature diagram to illustrate the areas of minimum lubrication and cooling.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Hydraulic controllers for automatic transmissions comprising a hydrodynamic converter and a converter clutch are well-known to the specialist, such that, within the framework of the following description of figures, only the components relevant to the invention are described and explained.

FIGS. 2-6 show a hydraulic controller for automatic transmission comprising a hydrodynamic converter 6 and a converter clutch 7. The embodiments shown differ with respect to the varying arrangements and designs of the device in accordance with exemplary aspects of the invention. FIGS. 2-6 designate a converter clutch valve with WK-V, a converter pressure valve with WD-V, a converter switching valve with SV-WD, a converter base point valve with WK-FP-V, and a converter retaining valve with WRH-V. Furthermore, a radiator is shown with 1 and a radiator bypass is shown with 5; it is ensured through these that the oil is not directed through the radiator 1 at low temperatures. P_zT thereby designates the converter ring inlet pressure, whereas p_vT designates the converter ring outlet pressure and p_WK designates the converter clutch pressure.

Figure 2:
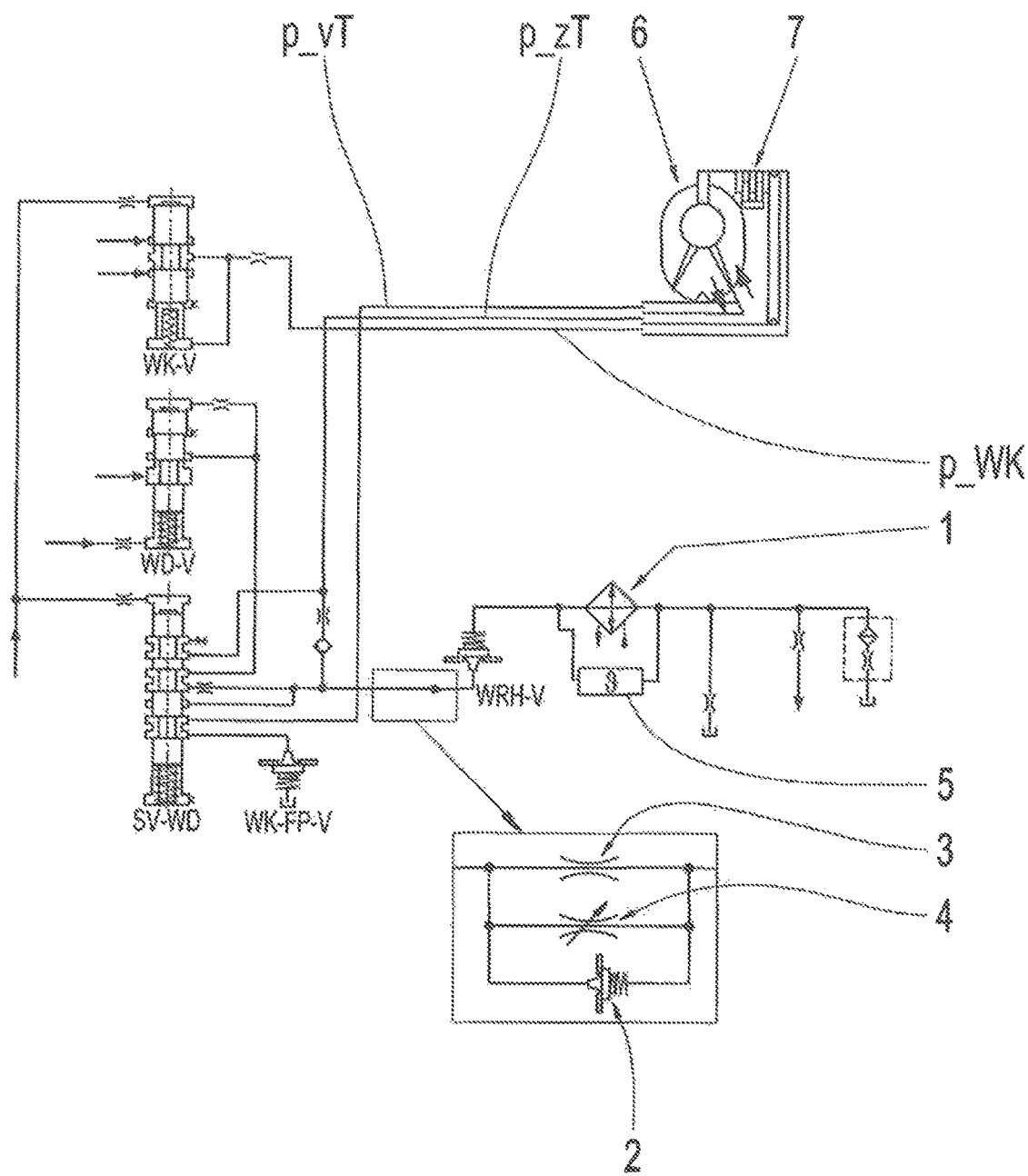
FIG. 2: A schematic presentation of a first exemplary embodiment of the invention.

According to a first variant of the invention and with reference to FIG. 2, a device for reducing the drag torque in an automatic transmission comprising a hydrodynamic converter 6 and a converter clutch 7 is proposed, which, in the hydraulic controller of the transmission in front of the radiator 1, features a parallel connection of a pressure relief valve 2 in the direction of flow to the radiator 1 that opens against a spring force, a constant aperture 3 securing a minimum flow of oil and a temperature-dependent, switchable aperture 4 opening above a temperature threshold θ_SP. The pressure relief valve may be designed as a plate valve.

The combination of the parallel connection of the pressure relief valve 2, which in the example shown in FIG. 2 is designed as a plate valve, the constant aperture 3 and the temperature-dependent, switchable aperture 4 may be, in accordance with FIG. 2, arranged in the direction of flow to the radiator 1 after the paths of the closing pressure and the opening pressure of the converter clutch 7, by which a minimum lubrication and cooling is ensured upon the opening and closing of the converter clutch. Furthermore, the parallel connection of the pressure relief valve 2, the constant aperture 3 and the temperature-dependent, switchable aperture 4 may be arranged in the direction of flow to the radiator 1 in front of or after the converter retaining valve WRH-V.

Figure 4:
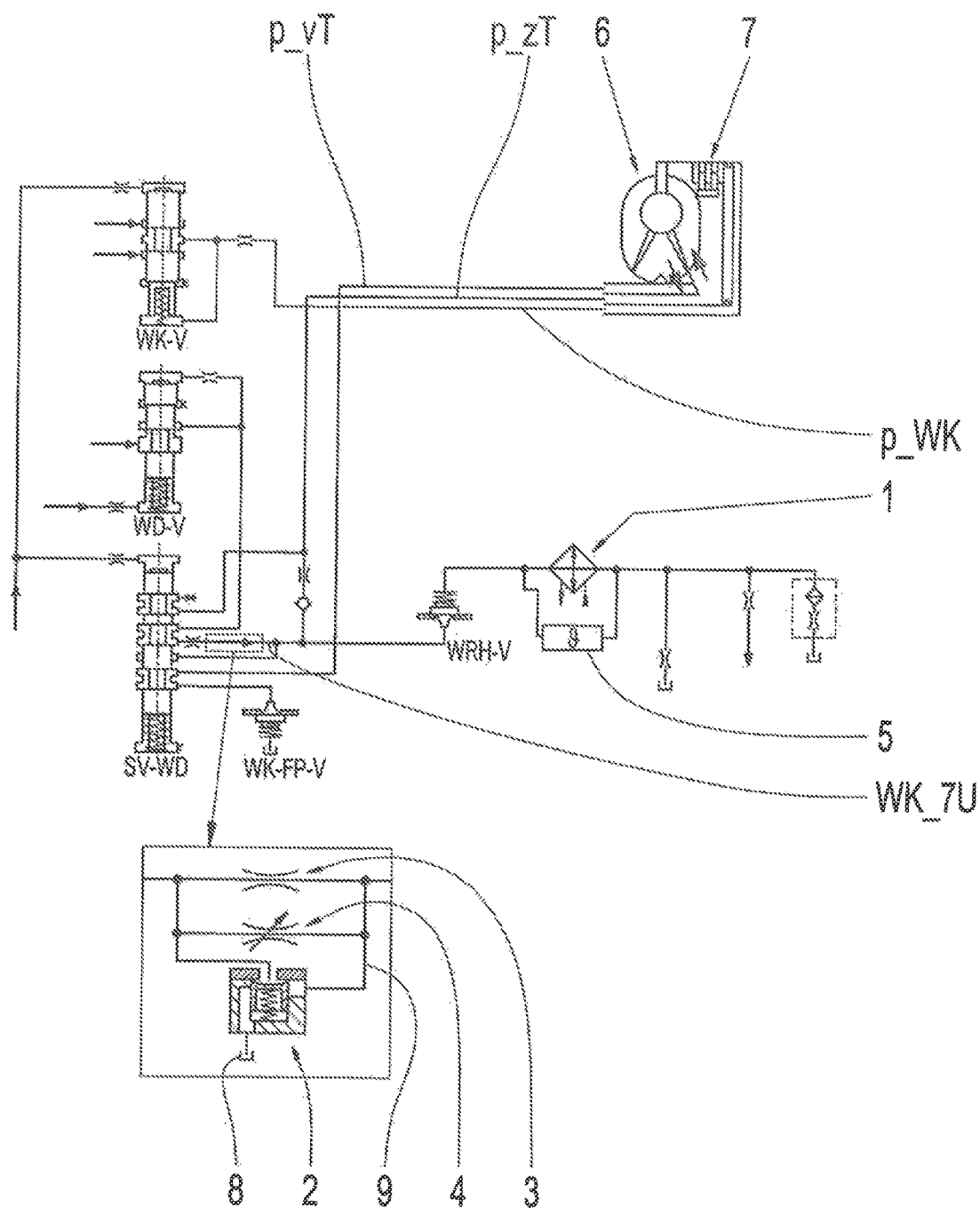
FIG. 4: A schematic presentation of a third exemplary embodiment of the invention.

Within the framework of an additional form of the invention, the parallel connection of the pressure relief valve 2, the constant aperture 3 and the temperature-dependent, switchable aperture 4 may be arranged in the direction of flow to radiator 1 in the path of the closing pressure of the converter clutch (WK-to-path), by which no minimum lubrication and cooling is achieved with an open converter clutch 7. (FIG. 4)

Through the arrangement in accordance with FIG. 2, a minimum lubrication and cooling at low temperatures and low system pressures is ensured, since, at low temperatures that fall below a predetermined temperature threshold θ_SP, the temperature-dependent, switchable aperture 4 remains closed and, at low pressures that fall below a predetermined pressure p_Sys_SP, the pressure relief valve 2 remains closed. This is illustrated with reference to FIG. 1.

It is thereby clear that, at temperatures up to a maximum of θ_SP and pressures up to a maximum of p_Sys_SP, the minimum lubrication and cooling is provided through the constant aperture 3. At temperatures that exceed θ_SP, the volume flow increases. Furthermore, at a system pressure that exceeds p_Sys_SP, the oil flow increases, in order to not cause any damages to the transmission components at high transmission loads and low oil temperatures, and in order to ensure a sufficient filling of the reservoir for shifting. Preferably, the temperature-dependent, switchable aperture 4 and the pressure-limiting valve 2 are designed in such a manner that, with an open temperature-dependent, switchable aperture 4 or with an open pressure relief valve 2, the volume flow to the radiator 1 corresponds to the normal level corresponding to the current system pressure.

Figure 3:
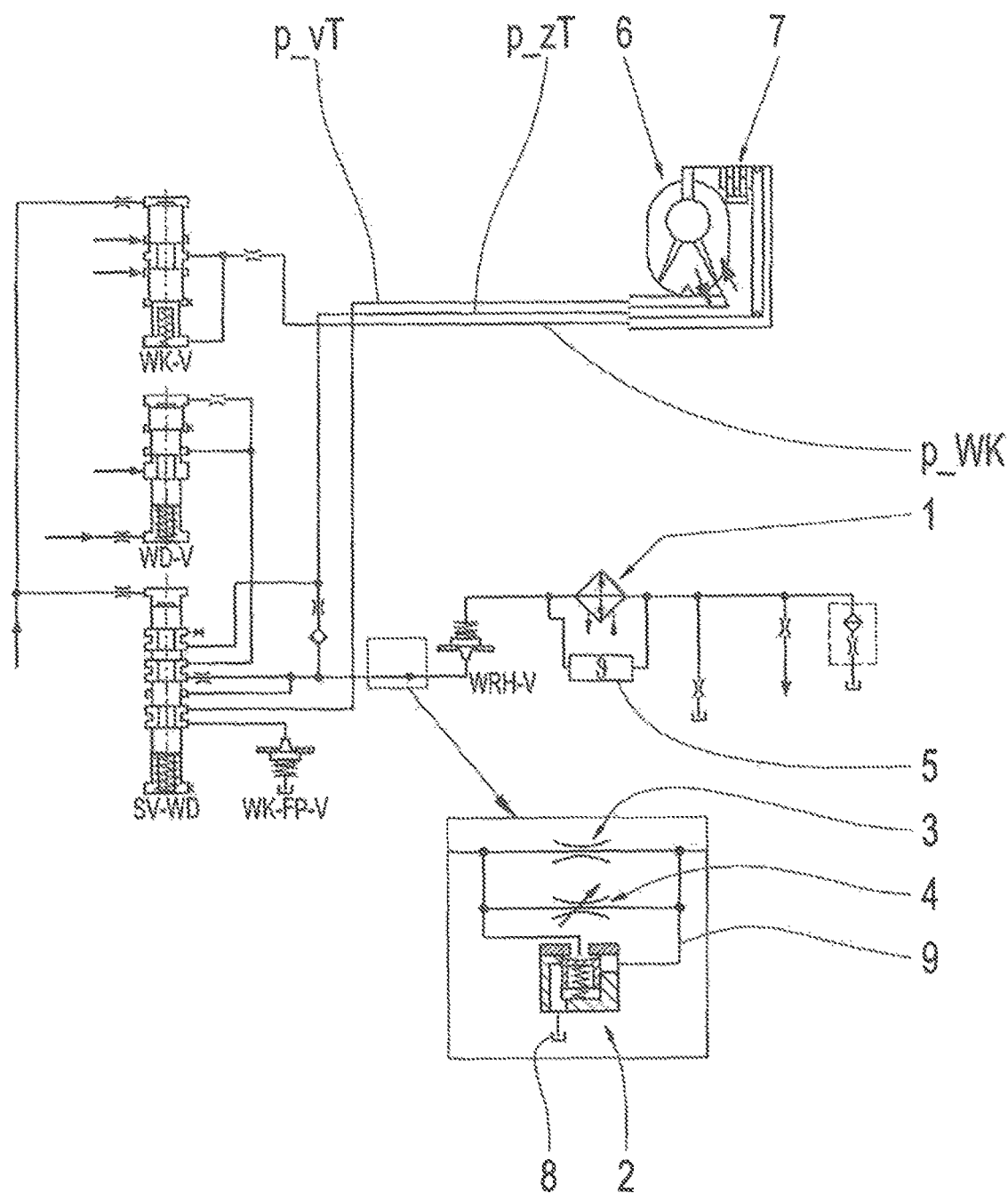
FIG. 3: A schematic presentation of a second exemplary embodiment of the invention.

The subject matter of FIG. 3 is an embodiment that differs from the embodiment in accordance with FIG. 2 in that the pressure relief valve 2 designed as a plate valve is designed in such a manner that pressure that is caused, for example, by the radiator resistance, does not act on the return surface of the plate valve. In contrast to the pressure relief valve 2 in accordance with FIG. 2, the pressure in the opening direction of the valve is not the differential pressure between the two sides of the valve 2, but is only the pressure at the side of the valve 2 turned away from the radiator 1, which results in a defined, precise opening pressure in the line to the radiator 1.

With the pressure relief valve 2 shown, at a pressure that exceeds a predetermined pressure p_Sys_SP, the valve 2 is open and enables the flow of oil through the line 9 to the radiator 1; in addition, at pressures that exceed an additional predetermined threshold value, which is higher than p_Sys_SP, the spring of the valve 2 is compressed so far that a part of the volume flow flows in the direction of the sump 8, by which the system is advantageously protected against pressure peaks.

In the embodiment shown in FIG. 4, a parallel connection of the pressure relief valve 2, the constant aperture 3 and the temperature-dependent, switchable aperture 4 in accordance with FIG. 3 are arranged in the path of the closing pressure of the converter clutch (WK-to-path); thereby, with an open converter clutch 7, a minimum lubrication and cooling is not achieved. The pressure relief valve designed as a plate valve may be designed in such a manner that pressure does not act on the return surface of the plate valve.

Figure 5:
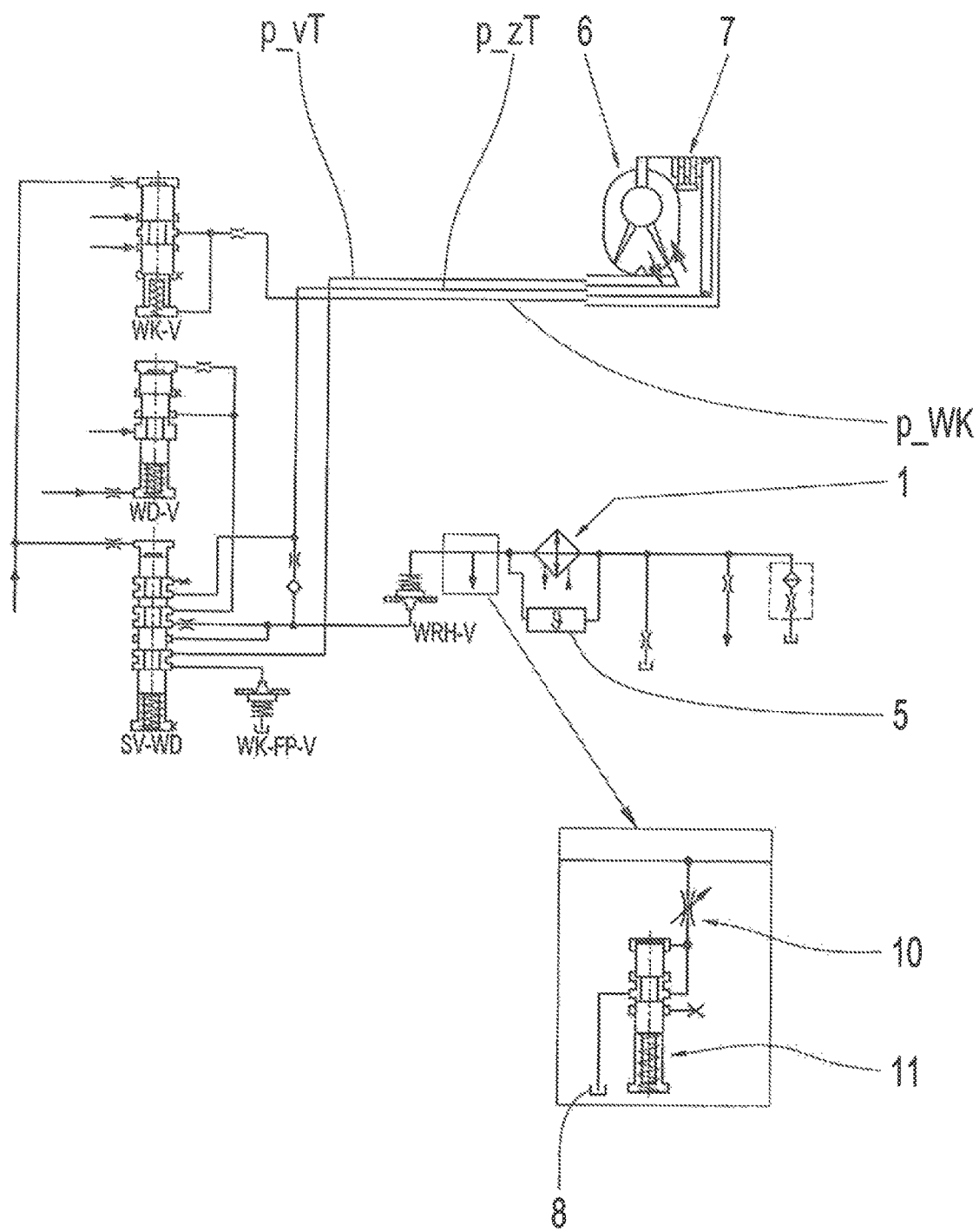
FIG. 5: A schematic presentation of a fourth exemplary embodiment of the invention.

The subject matter of FIG. 5 is an embodiment of the invention, with which, in the hydraulic controller of the transmission in front of the radiator 1, in the direction of flow to the radiator 1, a diversion of the overflow of the quantity of cooling oil by means of a temperature-dependent, switchable aperture 10 closing above a temperature threshold and a temperature-dependent, switchable pressure relief valve 11 closing above a pressure threshold, which are shifted in the sequence of aperture 10, pressure relief valve 11, is provided.

At temperatures that fall below a predetermined temperature threshold θ_SP, the temperature-dependent, switchable aperture 10 is open; furthermore, at low pressures that fall below a predetermined pressure p_Sys_SP, the pressure relief valve 11 is opened, and, above p_Sys_SP, is closed. With an open pressure relief valve 11, the diverted oil flows into the sump 8. In this manner, minimum lubrication and cooling is achieved at temperatures up to a maximum of θ_SP or pressures up to a maximum of p_Sys_SP. At temperatures that exceed θ_SP and pressures that exceed p_Sys_SP, a diversion of the oil is not achieved; the volume flow to the radiator 1 corresponds to the normal level corresponding to the current system pressure. The temperature-dependent, switchable aperture 10 may be designed as a bimetal aperture.

Figure 6:
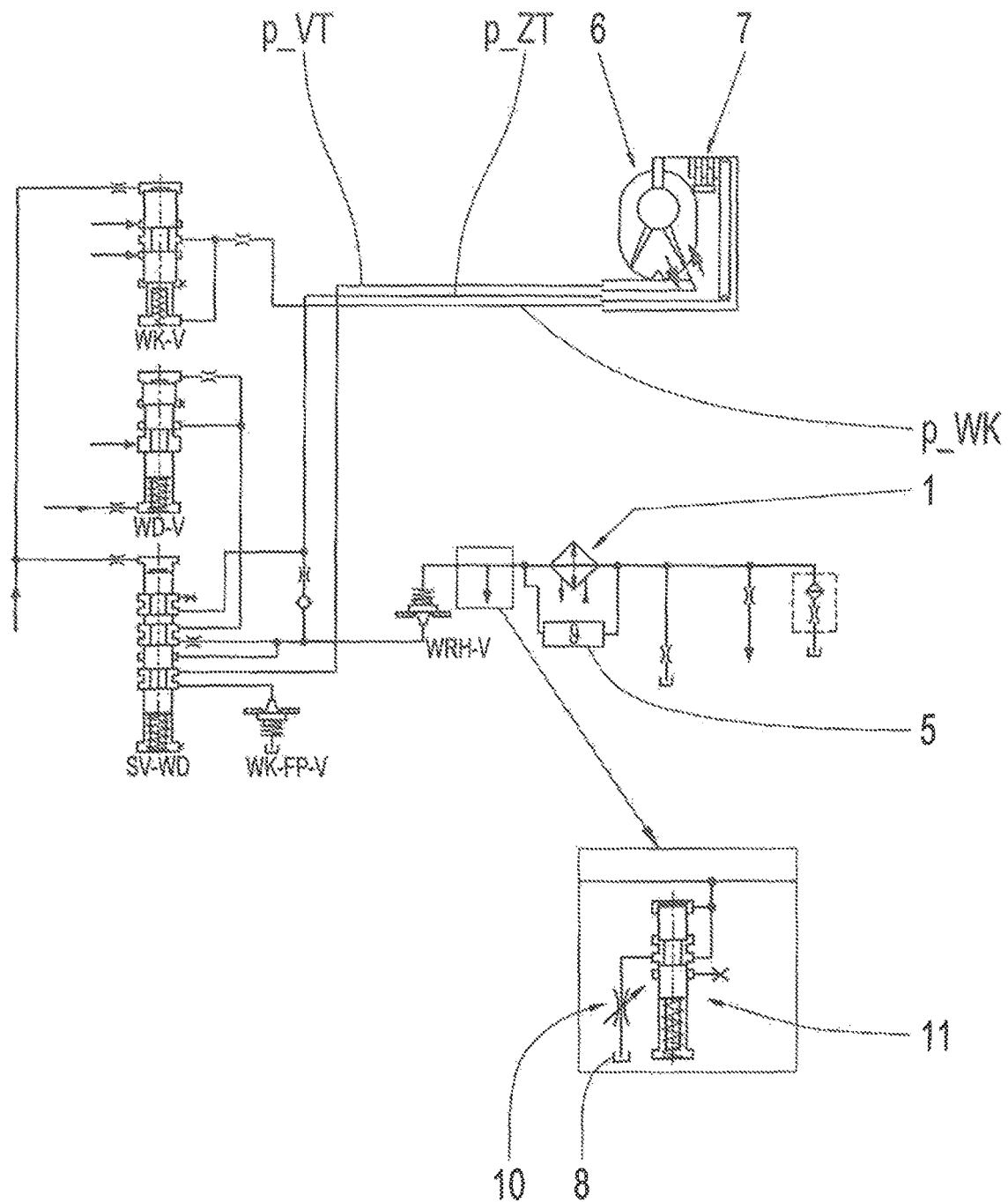
FIG. 6: A schematic presentation of an additional exemplary embodiment of the invention.

As an alternative to the sequence of aperture 10, pressure relief valve 11, the aperture 10 and the pressure relief valve 11 may be arranged in the sequence of pressure relief valve 11, aperture 10, as illustrated in FIG. 6. Thereby, the pressure that, with an open pressure relief valve 11, acts on the aperture 10 is lower than that in the embodiment in accordance with FIG. 5.

Modifications and variations can be made to the embodiments illustrated or described herein without departing from the scope and spirit of the invention as set forth in the appended claims.

REFERENCE SIGNS

1 Radiator
2 Pressure relief valve
3 Constant aperture
4 Temperature-dependent, switchable aperture
5 Radiator bypass
6 Converter
7 Converter clutch
8 Sump
9 Line
10 Temperature-dependent, switchable aperture
11 Pressure relief valve

The invention claimed is:

1. A drag torque reduction device for an automatic transmission, comprising:
    a plurality of multi-disk shift elements;
    a hydrodynamic torque converter;
    a converter clutch; and
    a hydraulic controller with a radiator, the hydraulic controller operable to control the plurality of multi-disk shift elements, the hydrodynamic torque converter and the converter clutch, the hydraulic controller comprising a parallel connection of a pressure relief valve, a constant aperture and a temperature-dependent, switchable aperture that is positioned upstream of the radiator relative to a flow of fluid to the radiator, the pressure relief valve configured to open against a spring force above a pressure threshold, the constant aperture configured to permit a minimum flow through the parallel connection to the radiator, the temperature-dependent, switchable aperture configured to open above a temperature threshold, the parallel connection providing a minimum lubrication and cooling at low temperatures below the temperature threshold and low system pressures below the pressure threshold by closing the temperature-dependent, switchable aperture at temperatures below the temperature threshold and closing the pressure relief valve at pressures below the pressure threshold.

2. The drag torque reduction device of claim 1, wherein the temperature-dependent, switchable aperture and the pressure-limiting valve are configured such that a volume flow to the radiator corresponds to a normal level for a current system pressure when the temperature-dependent, switchable aperture or the pressure relief valve is open, the normal level being greater than the minimum flow through the parallel connection to the radiator.

3. The drag torque reduction device of claim 1, wherein the parallel connection of the pressure relief valve, the constant aperture and the temperature-dependent, switchable aperture is disposed downstream of flow paths for closing pressure and opening pressure of the converter clutch and upstream or downstream of a converter retaining valve.

4. The drag torque reduction device of claim 1, wherein the parallel connection of the pressure relief valve, the constant aperture and the temperature-dependent, switchable aperture is in fluid communication with a flow path for a closing pressure of the converter clutch.

5. The drag torque reduction device of claim 1, wherein the pressure relief valve is a plate valve, the plate valve having a return surface, a pressure in an opening direction of the plate valve is not a differential pressure between two sides of the plate valve but is only the pressure at a side of the plate valve facing away from the radiator.

6. The drag torque reduction device of claim 5, wherein the pressure relief valve is open and enables a flow of oil through a line to the radiator at a pressure that exceeds the pressure threshold, the spring of the pressure relief valve compressed so that a part of the volume flow flows to a sump at pressures that exceed an additional threshold pressure, the additional threshold pressure greater than the threshold pressure.

7. A drag torque reduction device for an automatic transmission, comprising:
    a plurality of multi-disk shift elements;
    a hydrodynamic torque converter;
    a converter clutch; and
    a hydraulic controller with a radiator, the hydraulic controller comprising an overflow cooling oil diversion with a temperature-dependent, switchable aperture and a pressure relief valve that is positioned upstream of the radiator relative to a flow of fluid to the radiator, the pressure relief valve configured to close above a pressure threshold, the temperature-dependent, switchable aperture configured to close above a temperature threshold, a shifting sequence of the overflow cooling oil diversion being either
        (1) the temperature-dependent, switchable aperture then the pressure relief valve, or
        (2) the pressure relief valve then the temperature-dependent, switchable aperture.

* * * * *